(No Model.)

H. D. TAGGART.
SYRINGE VALVE.

No. 528,701.  Patented Nov. 6, 1894.

Witnesses:
C. E. Humphrey
Ida Oser

Inventor.
Horace D. Taggart;
by C. P. Humphrey, atty.

UNITED STATES PATENT OFFICE.

HORACE D. TAGGART, OF AKRON, OHIO.

SYRINGE-VALVE.

SPECIFICATION forming part of Letters Patent No. 528,701, dated November 6, 1894.

Application filed March 9, 1894. Serial No. 503,068. (No model.)

*To all whom it may concern:*

Be it known that I, HORACE D. TAGGART, a citizen of the United States, residing at Akron, in the county of Summit and State of Ohio, have invented a certain new and useful Improvement in Attachments for Surgical Syringes, of which the following is a specification.

My invention has relation to appliances for surgical syringes as for forcing or as for aspirators, and the object of my invention is to provide a new and improved valve to be interposed between the syringe tip and the insertion instrument, or at any desired portion of a surgical syringe where needed or custom, use or necessity requires.

To the aforesaid objects my invention consists in the peculiar and novel construction and arrangement of parts hereinafter described and then specifically claimed, reference being had to the accompanying drawings forming a part of this specification.

Figure 1:
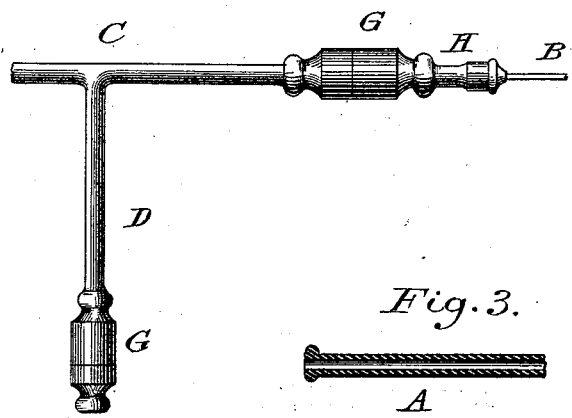
Figure 3:
Figure 2:
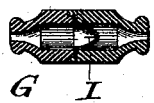
Figure 4:

In the accompanying drawings in which similar reference letters indicate like parts in the different views, Figure 1 is a side elevation of two rubber pipes of a surgical syringe with my improved valves therein; Fig. 2, a longitudinal section of my valve; Fig. 3, a section of an ordinary syringe pipe having a bead on its end to more closely hold and retain the end of my valve case; Fig. 4, a central longitudinal section of the conical valve proper.

In the drawings, Fig. 1, shows a syringe pipe C, with a "T" branch, D, each having a valve G, therein and an ordinary tip, B, connected by a short pipe, H. These valves G, consist of a firm separable outer case preferably of hard rubber tapering toward each end and having a slight bead or rim to retain the pipes. The cases are for convenience of inserting the valves made in two parts and adapted to be screwed together as shown in Fig. 4, and clamp the flange of the valve between them, this valve being a soft hollow rubber cone, I, with a radial flange at its base to be compressed between the abutting members of the valve case, and cut centrally lengthwise for a short distance toward its base. These valves are readily inserted in the ends of the pipe and as their ends are similar they may be readily reversed to adapt them to the manifold use such a valve would have.

What I claim is—

1. As an improved valve for flexible tubes for surgical syringes, a rigid separable hollow case having tapering ends adapted to enter the tubes and be retained therein, and a valve consisting of a cone of flexible material cut centrally, lengthwise toward its base and held by the abutting portions of said case substantially as shown and described.

2. In a valve for flexible tubes, the combination with a hollow case formed of two parts arranged to be screwed together, of a hollow cone of flexible material cut centrally lengthwise from its apex, and having a radial flange about its base adapted to be grasped between and held by the abutting parts of said case substantially as shown and described.

In testimony that I claim the above I hereunto set my hand.

HORACE D. TAGGART.

In presence of—
C. P. HUMPHREY,
C. E. HUMPHREY.